(12) United States Patent
Lim et al.

(10) Patent No.: US 9,213,321 B2
(45) Date of Patent: Dec. 15, 2015

(54) CONTROL SYSTEM FOR ROTATING SHAFT

(75) Inventors: Yong-Seob Lim, Changwon (KR); Seung-Jin Choi, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 489 days.

(21) Appl. No.: 13/604,167

(22) Filed: Sep. 5, 2012

(65) Prior Publication Data

US 2013/0069581 A1 Mar. 21, 2013

(30) Foreign Application Priority Data

Sep. 19, 2011 (KR) .......................... 10-2011-0094278

(51) Int. Cl.
*G05D 23/275* (2006.01)
*G05B 11/36* (2006.01)
(52) U.S. Cl.
CPC ...................................... *G05B 11/36* (2013.01)
(58) Field of Classification Search
USPC .................................................. 318/560, 632
See application file for complete search history.

(56) References Cited

U.S. PATENT DOCUMENTS

| 6,212,443 | B1 | 4/2001 | Nagata et al. | |
|---|---|---|---|---|
| 6,594,568 | B2 | 7/2003 | Matsuoka | |
| 2008/0034954 | A1* | 2/2008 | Grober | 89/41.05 |
| 2011/0042459 | A1* | 2/2011 | Sullivan et al. | 235/407 |
| 2012/0245711 | A1* | 9/2012 | Park | 700/13 |

FOREIGN PATENT DOCUMENTS

| KR | 10-0449429 B1 | 12/2004 |
|---|---|---|
| KR | 10-2010-0000358 A | 1/2010 |
| KR | 10-2010-0101915 A | 9/2010 |

* cited by examiner

*Primary Examiner* — Kawing Chan
(74) *Attorney, Agent, or Firm* — Sughrue Mion, PLLC (57) ABSTRACT

A rotating element control system includes a rotating element rotatably disposed on a main body, a first sensing unit which senses a rotational speed of the main body, a driving unit which drives the rotating element, a second sensing unit which senses a rotational speed of the rotating element, a torque compensation unit which generates a first compensation signal within a first range and a second compensation signal within a second range, and a stabilization control unit which controls the driving unit based on the first and second compensation signals and a difference between a speed of a command to drive the rotating element and the rotational speed of the rotating element.

17 Claims, 7 Drawing Sheets

CONTROL SYSTEM FOR ROTATING SHAFT

CROSS-REFERENCE TO RELATED PATENT APPLICATIONS

This application claims priority from Korean Patent Application No. 10-2011-0094278, filed on Sep. 19, 2011, in the Korean Intellectual Property Office, the disclosure of which is incorporated herein by reference in its entirety.

BACKGROUND

1. Field

Apparatuses and methods consistent with exemplary embodiments relate to a rotating shaft control system, and more particularly, to a rotating shaft control system having an improved degree of accuracy in terms of stability by reducing influence of a frictional force acting between mechanical elements.

2. Description of the Related Art

A remote control weapon station (RCWS) is a system that enables precise shooting on a target by adjusting a weapon from a remote place to prevent a gunner from being exposed to the outside when performing a battle operation at a near or far distance. The RCWS is mounted on a variety of vehicles such as unmanned vehicles, unmanned armored vehicles, unmanned planes, unmanned patrol boats, etc.

Since a gunner located at a remote place from an RCWS performs shooting by adjusting a target shooting point of a weapon, a direction of the weapon of the RCWS needs to be rapidly and accurately controlled.

Korean Patent Publication No. 2010-0101915 discloses technology relating to a control system for an RCWS, in which an error signal due to a difference between an output speed and an input speed of a driving unit is used for compensating for a frictional force. However, since the control system considers only a frictional force generated from inside the RCWS, an amount of a motion of a vehicle equipped with the RCWS and driving of a rotating shaft according to a speed command instructed by an operator are not free from influence of various frictional disturbances generated by mechanical constituent elements of the RCWS.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a rotating element control system having an improved degree of accuracy in terms of stability by reducing influence of a frictional force acting between mechanical elements.

One or more exemplary embodiments also provide a rotating element control system having a function to effectively remove an error component generated by a frictional force acting between mechanical elements.

According to an aspect of an exemplary embodiment, a rotating shaft control system includes a rotating element rotatably disposed on a main body, a first measuring unit which measures a rotational movement of the main body, a driving unit which drives the rotating element, a second measuring unit which measures a rotational speed of the rotating element, a torque compensation unit which generates a first compensation signal and a second compensation signal and a difference between a speed of a command to drive the rotating element and the rotational speed of the rotating shaft sensed by the second sensing unit.

The torque compensation unit generates the first compensation signal if the difference between the rotational speed of the main body and the command speed within a first range which is less than a predetermined critical value, and generates the second compensation signal if the difference between the rotational speed of the main body and the command speed is within a second range which is equal to or greater than the predetermined critical value.

The first compensation signal may be 0 within the first range and the second compensation signal may be calculated by an equation, $T_{fric}=K_t \cdot A \cdot \text{sign}(\omega_r-\omega_h)$ within the second range, $$T_{fric} = \begin{cases} 0 & |\omega_r - \omega_h| < \varepsilon \\ K_t \cdot A \cdot \text{sign}(\omega_r - \omega_h) & |\omega_r - \omega_h| \geq \varepsilon \end{cases} \quad \text{[Equation 1]}$$

wherein "$T_{fric}$" denotes the compensation signals, "Kt" denotes a motor constant, "A" denotes current applied to the driving unit, "sign(x)" denotes a function for outputting 1 or −1 according to a sign of x," "$\omega_h$" denotes the rotational speed of the main body, and "$\omega_r$" denotes the command speed.

The first compensation signal may be calculated by an equation, $T_{fric}$ within the first range, and the second compensation signal is calculated by another equation, $T_{fric}=$within the second range, $$T_{fric} = \begin{cases} \dfrac{K_t \cdot A}{\varepsilon} \cdot (\omega_r - \omega_h), & |\omega_r - \omega_h| < \varepsilon \\ K_t \cdot A \cdot \text{sign}(\omega_r - \omega_h) & |\omega_r - \omega_h| \geq \varepsilon \end{cases} \quad \text{[Equation 2]}$$

wherein "$T_{fric}$" denotes the first compensation signal and the second compensation signal, "$K_t$" denotes a motor constant, "A" denotes current applied to the driving unit, "sign (x)" denotes a function for outputting 1 or −1 according to a sign of x," "$\omega_h$" denotes the rotational speed of the main body, and "$\omega_r$" denotes the command speed.

BRIEF DESCRIPTION OF THE DRAWINGS

The above and other aspects will become more apparent by describing in detail exemplary embodiments thereof with reference to the attached drawings in which.

DETAILED DESCRIPTION

Hereinafter, exemplary embodiments will be described in detail with reference to the attached drawings. Like reference numerals in the drawings denote like elements.

Figure 1A:
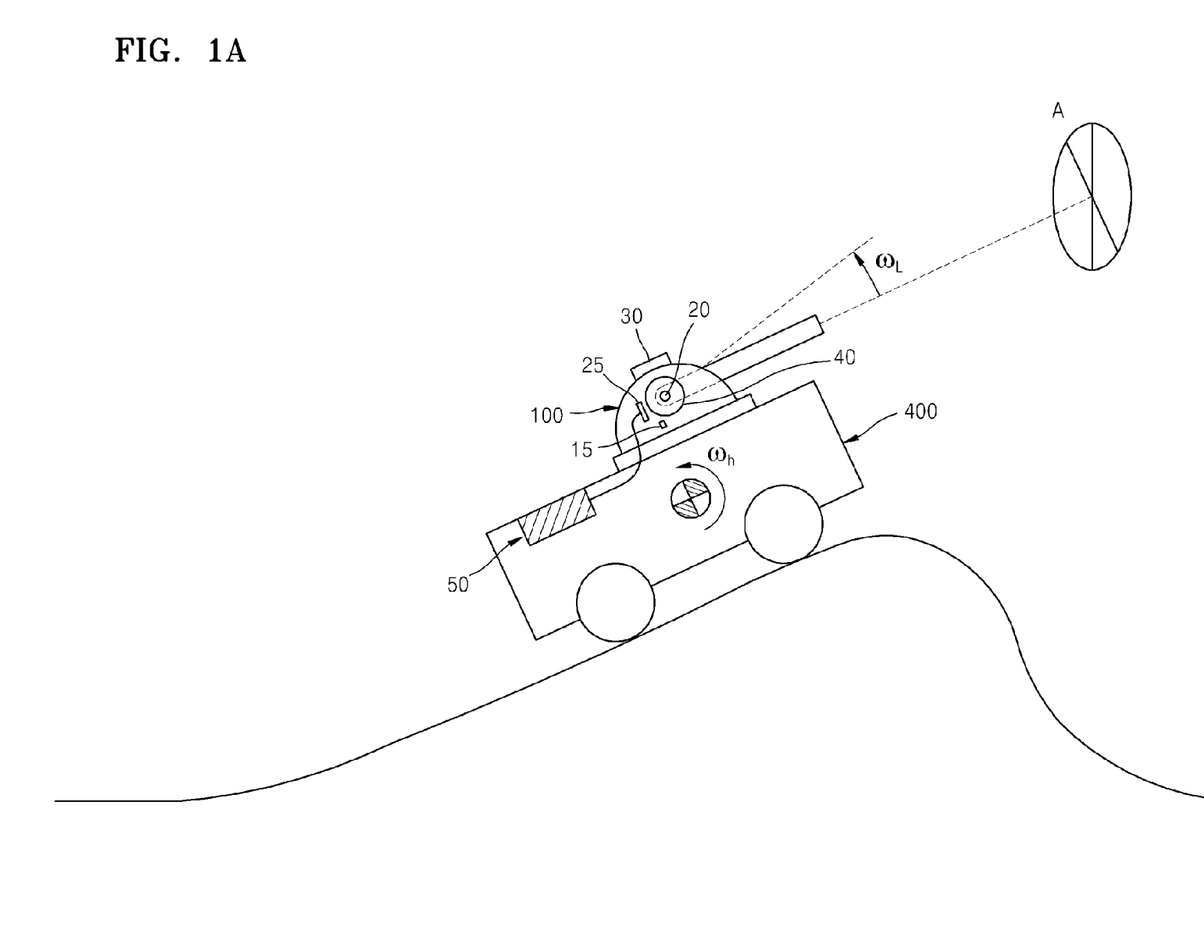
FIG. 1A is a conceptual view schematically illustrating an operational state of an RCWS having a rotating shaft control system according to an exemplary embodiment.

FIG. 1A is a conceptual view schematically illustrating an operational state of a remote control weapon station (RCWS) having a rotating shaft control system according to an embodiment. Referring to FIG. 1A, the rotating shaft control system according to the present embodiment is used to control driving of an RCWS 100 and includes a rotating shaft 20 rotatably installed on a main body 400, a first sensing unit 15 for sensing a rotational speed of the main body 400, a driving unit 30 for driving the rotating shaft 20, a second sensing unit 25 for sensing a rotational speed of the rotating shaft 20, and a control unit 50. A transfer unit 40 for transferring a driving force is arranged between the rotating shaft 20 and the driving unit 30.

Although in FIG. 1A the main body 400 where the RCWS 100 is installed is a vehicle, the exemplary embodiment is not limited thereto and the RCWS 100 may be installed on any moving device, for example, a ship, a patrol boat, an unmanned scout robot, etc.

Referring to FIG. 1A, the main body 400 equipped with the RCWS 100 is capable of moving toward a target point A and performing sensing and shooting on the target point A with the rotating shaft 20 of the RCWS 100 rotating at a rotational speed $\omega_L$ while the main body 400 is moving. Since the main body 400 rotates at a rotational speed $\omega_h$ according to a terrain through which the main body 400 travels, a rotational motion generated by the main body 400 may have an influence on control of the RCWS 100.

Disturbance motions of the main body 400 forming a platform for installing the RCWS 100 may be generally divided into two types: an azimuth or yaw motion and an elevation or pitch motion. A motion related to the rotational speed $\omega_h$ in FIG. 1A corresponds to an elevation motion. In FIG. 1A, a rotational motion in only an elevation direction is illustrated for convenience of explanation.

In order to measure the rotational speed $\omega_h$ related to a motion in the elevation direction, instead of directly attaching a sensor to the main body 400, sensors installed to control the RCWS 100, that is, a gyro sensor and an encoder, are used to obtain a signal directly or indirectly indicating a yaw motion and an elevation motion.

First, it is simple to obtain an angular speed of a motion of the main body 400 in the elevation direction acting as a disturbance in the elevation (or pitch) direction. That is, a pitch angular speed of a gyro sensor installed on the RCWS 100 is used as it is.

In FIG. 1A, the first sensing unit 15 installed on the RCWS 100 corresponds to a gyro sensor for sensing an angular speed of the main body 400. The gyro sensor installed on the RCWS 100 can be used because the main body 400 and the RCWS 100 form a single body by using a coupling device such as a bolt. Thus, pitch disturbance of the main body 400 is the same as a pitch angular speed of the RCWS 100.

Second, obtaining an angular speed of the main body 400 in a yaw direction acting as a disturbance in the yaw direction is slightly complicated compared to the obtaining of a pitch disturbance. A yaw-direction encoder 15b (see FIG. 1B) installed on the RCWS 100 may be used to measure an angular speed in the yaw direction.

Figure 1B:
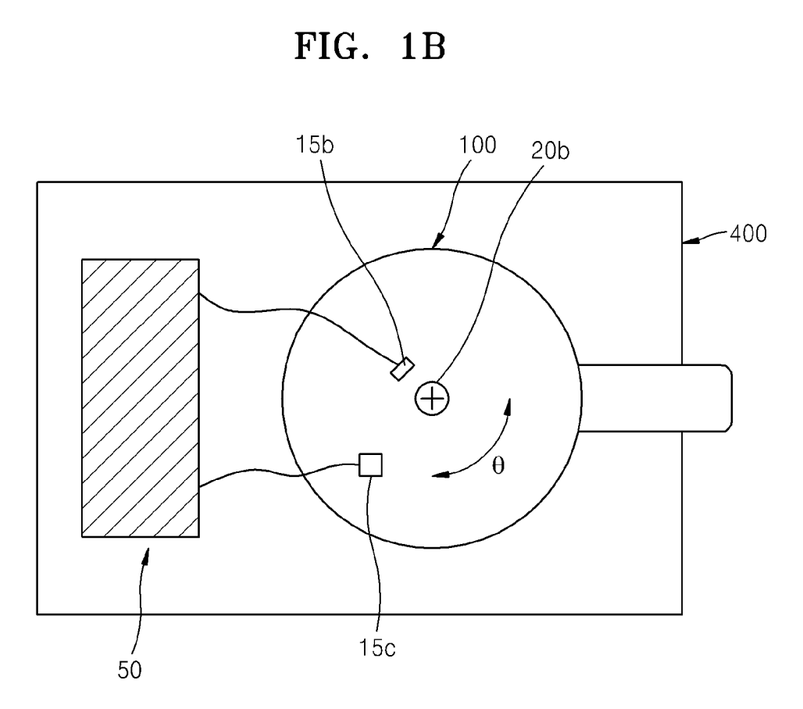
FIG. 1B is a conceptual view schematically illustrating a motion of the rotating shaft control system of FIG. 1A in a yaw direction.

FIG. 1B is a conceptual view schematically illustrating a motion of the rotating shaft control system of FIG. 1A in the yaw direction. In FIG. 1B, the illustration of some of constituent elements of FIG. 1A is omitted for convenience of illustration and only constituent elements related to the motion of the RCWS 100 in the yaw direction are illustrated.

The RCWS 100 may be installed to be rotatable in a direction indicated by θ (yaw direction) with respect to the main body 400. A motion of the RCWS 100 rotating in the direction θ is called a yaw motion. In order to sense a rotational motion of the RCWS 100 in the yaw direction, the yaw-direction encoder 15b and a yaw-direction gyro sensor 15c may be arranged on the RCWS 100. The control unit 50 may receive signals from the yaw-direction encoder 15b and the yaw-direction gyro sensor 15c.

The main body 400 and the RCWS 100 are not integrally coupled to rotate in the yaw direction. The RCWS 100 is installed to be rotatable in the yaw direction with respect to the main body 400 via a rotation gear (not shown) and a rotation bearing (not shown). Thus, the RCWS 100 and the main body 400 may rotate in different directions.

An angular speed in the yaw direction that is a disturbance in the yaw direction of the main body 400 may be indirectly obtained by using two sensors, that is, the yaw-direction encoder 15b and the yaw-direction gyro sensor 15c, installed on the RCWS 100. In other words, an angular speed in the yaw direction of the main body 400 may be obtained by subtracting a rotational angular speed of the RCWS 100, that is, a differential value of a yaw-direction encoder angular signal, from a yaw-direction gyro angular speed of the RCWS 100 rotatably mounted on the main body 400. This may be simply expressed as follows.

$$W_{z,h} = W_{z,gyro} - W_{z,enc} \qquad \text{[Equation 3]}$$

In the above Equation 3, "$W_{z,h}$" denotes a yaw-direction disturbance angular speed of a vehicle, "$W_{z,gyro}$" denotes a yaw-direction gyro angular speed mounted on the main body 400 of the RCWS 100, and "$W_{z,enc}$" denotes a rotational angular speed of the RCWS 100 itself, that is, a differential value of an encoder angular signal of the yaw-direction encoder 15b.

Figure 2:
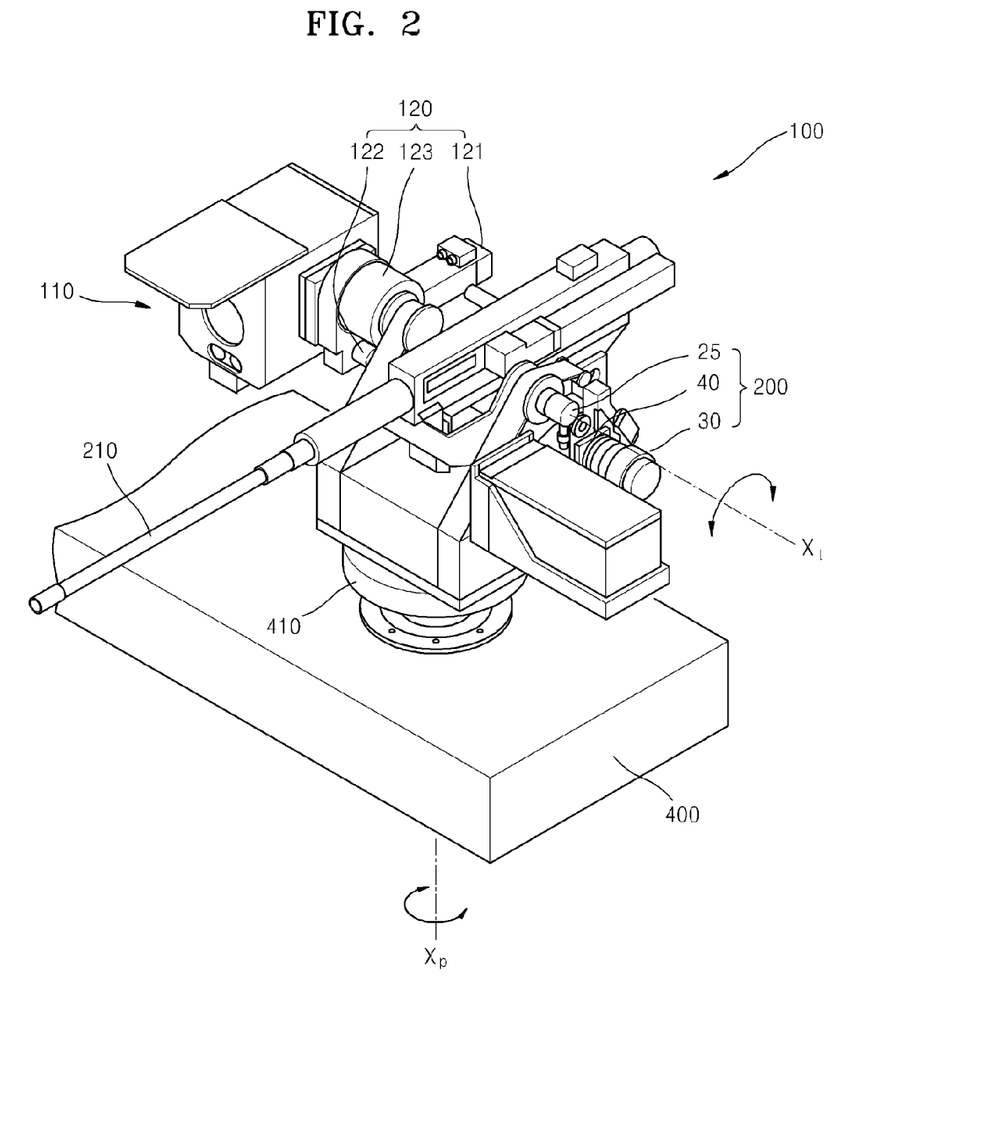
FIG. 2 is a perspective view illustrating an example of the RCWS of FIG. 1A.

FIG. 2 is a perspective view illustrating an example of the RCWS 100 of FIG. 1A. The RCWS 100 may include a weapon unit 200 and an imaging unit 110. The imaging unit 110 captures an image including a target (not shown). The weapon unit 200 shoots on the target.

The imaging unit 110 is coupled to the weapon unit 200 via an imaging unit driving unit 120. The imaging unit 110 captures an input image and may measure a target distance corresponding to a distance from the weapon unit 200 to the target. The imaging unit driving unit 120 may rotate the imaging unit 110 around at least one axis.

The imaging unit 110 may include a day-time camera (not shown), a night-time camera (not shown), and a rangefinder (not shown). The day-time camera may capture a day-time image and the night-time camera may capture a night-time image. The rangefinder may measure a target distance.

The imaging unit driving unit 120 may include an imaging unit driving motor 121, an encoder 122, and a decelerator 123. The imaging unit driving motor 121 provides a driving force to rotate the image unit 110 in at least one direction. The encoder 122 detects an amount of rotation of the imaging unit 110. The decelerator 123 decelerates rotation of the imaging unit driving motor 121.

The weapon unit 200 may include a shooting unit 210 that shoots on the target. The shooting unit 210 may be a gun or artillery capable of firing toward the target.

The driving unit 30 of the weapon unit 200 may rotate the shooting unit 210 around a first axis $X_t$. The weapon unit 200 may include the driving unit 30 for generating a rotational driving force, the transfer unit 40 for transferring the rotational driving force of the driving unit 30 to the rotating shaft 20 of FIG. 1A, and the second sensing unit 25 for sensing the rotational speed $\omega_L$ of the rotating shaft 20.

The driving unit 30 generates a driving force to rotate the shooting unit 210 around at least the first axis $X_t$. The second sensing unit 25 senses a rotational speed of the shooting unit 210. The transfer unit 30 decelerates rotation of the driving unit 30.

The shooting unit 210 of the weapon unit 200 is rotatably installed on the main body 400 via the rotating shaft 20 of FIG. 1A. Also, the weapon unit 200 may be coupled to the main body 400 to be capable of rotating around a second axis Xp in a vertical direction via a horizontal rotation driving unit 410.

According to the RCWS 100 configured as above, the shooting unit 210 may sense the target and perform shooting while performing a tilting motion (elevation motion) by rotating around the first axis $X_t$ and a panning motion (yaw motion) by rotating around the second axis $X_p$.

Referring to FIG. 1A, the RCWS 100 may include the first sensing unit 15 to sense the rotational speed $\omega_h$ of the main body 400. Since the present embodiment is not limited to the above arrangement position of the first sensing unit 15, the first sensing unit 15 may be embodied by installing a separate sensor on the main body 400.

Shaking of the main body 400 may instantly cause an abrupt change in replacement of the RCWS 100. The driving unit 30 generates power to make the RCWS 100 aim at the target while the main body 400 travels around a tough terrain such as a mountainous area to perform target sensing and shooting jobs. The power generated by the driving unit 30 can stabilize the RCWS 100, that is, a load.

The rotating shaft control system according to the present embodiment is a system adopting a stabilization control algorithm for stabilizing a control operation of the RCWS 100 based on an analysis formed by a mechanical driving mechanism. Such a rotating shaft control system may improve a target aiming ability.

Although following description discusses the stabilization based on an analysis formed by the mechanical driving mechanism around the first axis $X_t$, the rotating shaft control system of the exemplary embodiment is not limited thereto. For example, the rotating shaft control system may be applied to control of a rotational motion of the RCWS 100 around the second axis $X_p$ or control of a rotational motion of the imaging unit 110.

Figure 3:
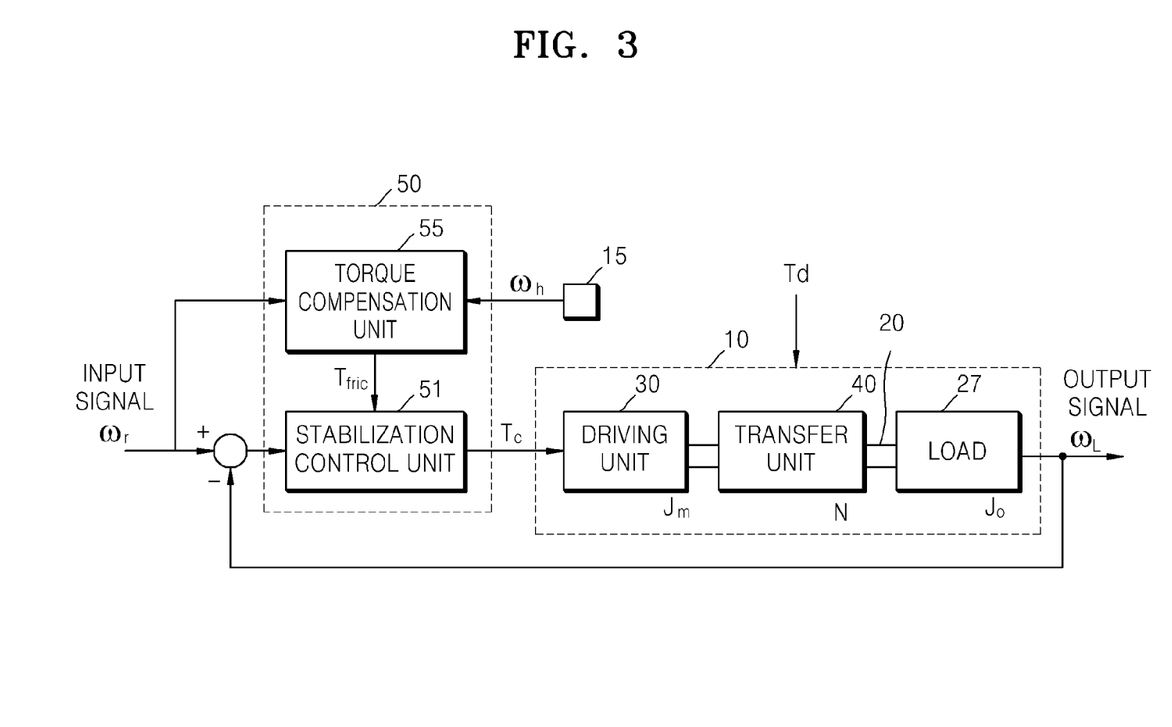
FIG. 3 is a block diagram illustrating constituent elements of a rotating shaft control system applied to the RCWS of FIG. 1A.

FIG. 3 is a block diagram illustrating constituent elements of the rotating shaft control system applied to the RCWS 100 of FIG. 1A. Referring to FIG. 3, the rotating shaft control system according to the present embodiment includes the rotating shaft 20 rotatably installed on the main body 400 of FIG. 1A, the first sensing unit 15 of FIG. 1A for sensing the rotation speed $\omega_h$ of the main body 400, the driving unit 30 for driving the rotating shaft 20, the second sensing unit 25 of FIG. 1A for sensing the rotational speed $\omega_L$ of the rotating shaft 20, a torque compensation unit 55 for generating a compensation signal to compensate for an error component generated by a frictional force acting between mechanical elements, and a stabilization control unit 51 for controlling the driving unit 30 based on a compensation torque signal $T_m$ and a difference between the rotational speed $\omega_L$ of the rotating shaft 20 and a stabilization input signal $\omega_r$, input to the stabilization control unit for controlling the driving unit 30. The transfer unit 40 for transferring a driving force may be installed between the rotating shaft 20 and the driving unit 30.

The torque compensation unit 55 and the stabilization control unit 51 form the control unit 50 for controlling driving of a mechanical system 10 including the driving unit 30, the transfer unit 40, the rotating shaft 20, and a load 27.

The control unit 50 may be embodied, for example, by a printed circuit board having various electronic parts and circuit patterns, by a semiconductor chip including software or circuits, or by software that is executable in a computer.

Also, each of the torque compensation unit 55 and the stabilization control unit 51 may be separately embodied in at least one form of a printed circuit board, a semiconductor chip, a part of circuits on a printed circuit board, and software.

A frictional force acts between mechanical elements forming the mechanical system 10. A frictional force refers to a resisting force existing in a mechanical element performing a relative motion. The frictional force causes unnecessary waste of energy, deterioration of position control performance, or instability of a system in a servo control system.

A frictional force may include static friction acting between mechanical elements that are not moving relative to each other, Coulomb friction acting between mechanical elements slidingly contacting each other, viscous friction generated by a frictional operation of a viscous fluid, Stribeck friction acting at a moment when a static state is shifted to a sliding state, etc.

In FIG. 3, the disturbance generated by the operation of a frictional force in the mechanical system 10 is expressed as Td. The torque compensation unit 55 generates a compensation signal $T_{fric}$ to compensate for an error component due to the disturbance Td.

When the driving unit 30 is converted from a forward direction to a reverse direction or vice versa, if an additional compensation torque $T_{fric}$ is generated to rapidly correspond to such a directional change, a stabilization error may be greatly reduced. The compensation signal $T_{fric}$ generated by the torque compensation unit 55 to make the driving unit 30 generate a frictional motor torque may be expressed by Equation 1.

$$T_{fric} = \begin{cases} 0 & |\omega_r - \omega_h| < \varepsilon \\ K_t \cdot A \cdot \text{sign}(\omega_r - \omega_h) & |\omega_r - \omega_h| \geq \varepsilon \end{cases} \quad [\text{Equation 1}]$$

Here, "$K_t$" denotes a motor constant, "A" denotes current applied to the driving unit 30, "sign(x)" denotes a function that outputs 1 or −1 according to the sign of x, "$\omega_h$" denotes the rotational speed of the main body 400, and "$\omega_r$" denotes a stabilization input signal for an target speed.

As a method of reducing the influence of the torque $T_d$ due to the disturbance, there is a method of reducing imbalance moment of a load and reducing friction during design of a control system of an RCWS. Also, the stabilization control unit 51 of FIG. 3 may be designed to remove the influence of the torque $T_d$ due to the disturbance.

Figure 4:
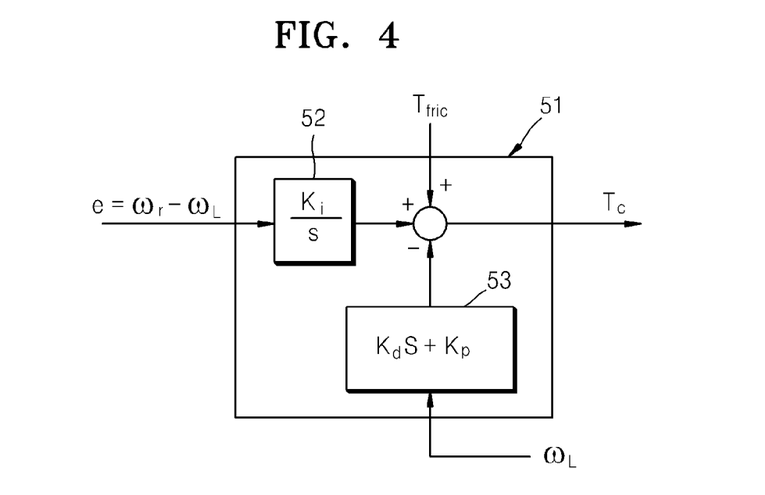
FIG. 4 is a block diagram illustrating a stabilization control unit of the rotating shaft control system of FIG. 1A.

FIG. 4 is a block diagram illustrating the stabilization control unit 51 of the rotating shaft control system of FIG. 1A. The stabilization control unit 51 included in the rotating shaft control system of FIG. 1A may be embodied in a variety of shapes and FIG. 4 illustrates one example thereof. The stabilization control unit 51 may include an integral controller 52 for integrating a difference $e(\omega_r-\omega_L)$ between the rotational speed $\omega_L$, that is, a speed of the load 27, and the stabilization input signal $\omega_r$, and a proportional derivative controller 53 using the rotational speed $\omega_L$ as an input. The stabilization control unit 51 may output a control signal Tc by adding the compensation signal $T_{fric}$ and an output signal of the integral controller 52 and subtracting an output signal of the proportional derivative controller 53 therefrom.

The embodiment of the rotating shaft control system of FIG. 1A is not limited to the detailed structure of the stabilization control unit 51 of FIG. 4 and may be modified to other types. For example, the stabilization control unit 51 may include at least one selected from the group consisting of a proportional controller, an integral controller, and a differential controller.

Figure 5A:
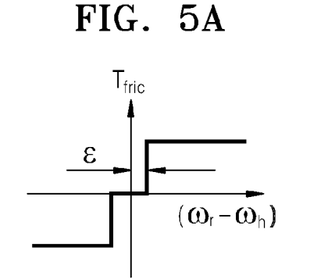
FIGS. 5A and 5B are graphs showing a degree of stabilization accuracy with a compensation signal in the rotating shaft control system of FIG. 1A.
Figure 5B:
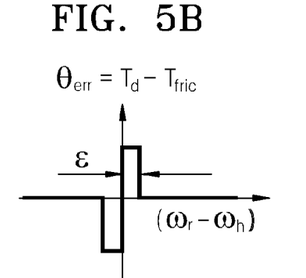

FIGS. 5A and 5B are graphs showing a degree of stabilization accuracy with a compensation signal in the rotating shaft control system of FIG. 1A. In FIG. 5A, the compensation signal $T_{fric}$ expressed by Equation 1 is shown. When a difference between the rotational speed $\omega_h$ and the stabilization input signal $\omega_r$ is less than a critical value $\epsilon$, the compensation signal $T_{fric}$ of a value of 0 is input as a first compensation signal. When the difference between the rotational speed $\omega_h$ and the stabilization input signal $\omega_r$ is equal to or greater than the critical value $\epsilon$, the compensation signal $T_{fric}$ of a predetermined value is input as a second compensation signal. A case when the difference between the rotational speed $\omega_L$ and the stabilization input signal $\omega_r$ is less than the critical value $\epsilon$ belongs to a first range. A case when the difference between the rotational speed $\omega_h$ and the stabilization input signal $\omega_r$ is equal to or greater than the critical value $\epsilon$ belongs to a second range.

As a result of application of the compensation signal $T_{fric}$, as shown in FIG. 5B, when the difference between the $\omega_r$ and the $\omega_h$ is equal to or greater than the critical value $\epsilon$, a value of $\theta_{err}(=T_d-T_{fric})$ indicating stabilization accuracy may be maintained to be 0.

Figure 6A:
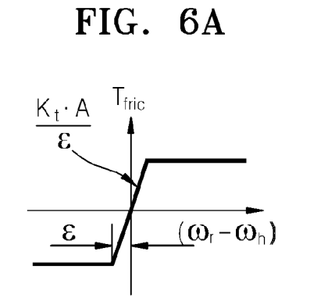
FIGS. 6A and 6B is graphs showing a degree of stabilization accuracy with another compensation signal in the rotating shaft control system of FIG. 1A.
Figure 6B:
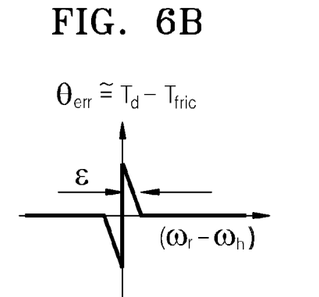

FIGS. 6A and 6B are graphs showing a degree of stabilization accuracy with another compensation signal in the rotating shaft control system of FIG. 1A. As a different example, the compensation signal $T_{fric}$ generated by the torque compensation unit 55 to make the driving unit 30 of FIG. 3 generate frictional motor torque may be expressed by Equation 2.

$$T_{fric} = \begin{cases} \frac{K_t \cdot A}{\varepsilon} \cdot (\omega_r - \omega_h), & |\omega_r - \omega_h| < \varepsilon \\ K_t \cdot A \cdot \text{sign}(\omega_r - \omega_h) & |\omega_r - \omega_h| \geq \varepsilon \end{cases} \quad \text{[Equation 2]}$$

The compensation signal $T_{fric}$ expressed by Equation 2 is obtained to improve an area corresponding to a dead zone in the example of FIG. 4, that is, an area where the compensation signal $T_{fric}$ is applied to be 0 because the difference between the $\omega_r$ and the $\omega_h$ is less than the critical value $\epsilon$. While the compensation signal $T_{fric}$ is applied to be 0 in an area where the difference between the $\omega_r$ and the $\omega_h$ is less than the critical value $\epsilon$, the compensation torque needs to be applied to remove the influence of friction due to the disturbance. Since the compensation torque may be generated even in the dead zone by using Equation 2, further stable rotating shaft control is available.

As shown in FIG. 6A, when the difference between the $\omega_r$ and the $\omega_h$ is less than the critical value $\epsilon$, the compensation signal $T_{fric}$ is applied as a value of the first compensation signal, that is, $$\frac{K_t \cdot A}{\varepsilon} \cdot (\omega_r - \omega_h).$$

When the difference between the $\omega_r$ and the $\Omega_h$ is less than the critical value $\epsilon$, the compensation signal $T_{fric}$ is applied as a value of the second compensation signal, that is, $K_t \cdot A \cdot \text{sign}(\omega_r-\omega_h)$. The case when the difference between the $\omega_r$ and the $\omega_h$ is less than the critical value $\epsilon$ belongs to the first range. The case when the difference between the $\omega_r$ and the $\omega_h$ is equal to or greater than the critical value $\epsilon$ belongs to the second range.

Here, "$K_t$" denotes a motor constant, "A" denotes current applied to the driving unit 30, "sign(x)" denotes a function that outputs 1 or −1 according to the sign of x, "$\omega_h$" denotes the rotational speed of the main body 400, and "$\omega_r$" denotes a stabilization input signal corresponding to a target speed.

As a result of application of the compensation signal $T_{fric}$, as shown in FIG. 6B, when the difference between the $\omega_r$ and the $\omega_h$ is less than the critical value $\epsilon$, a value of $\theta_{err}(=T_d-T_{fric})$ indicating stabilization accuracy may be changed according to the difference between the $\omega_r$ and the $\omega_h$.

The generation of an angular speed of a main body due to the rotation of the main body means that a driving unit needs to rotate in a forward or reverse direction in order to stabilize the rotating shaft control system. At this time, however, since the rotational motion of the main body is transferred to a mechanical system so that disturbance is generated due to a frictional force, the frictional disturbance due to the rotational motion of the main body needs to be considered for performing stabilization.

In a conventional feedback control system, to stabilize a control system, an output value output from the control system with respect to a command value is detected and used for feedback. However, as described above, in the rotating shaft control system according to the exemplary embodiment, an angular speed of the main body generated due to the rotation of the main body is detected and a compensation signal to compensate for torque is generated based on a difference between a target speed input to the system and the angular speed of the main body so that stabilization performance may be improved.

FIGS. 7A-7E are graphs showing characteristics of a rotating shaft control system when a friction compensation algorithm is not applied to the rotating shaft control system of FIG. 1A. FIGS. 8A-8E are graphs showing characteristics of a rotating shaft control system when a friction compensation algorithm is applied to the rotating shaft control system of FIG. 1A.

In FIGS. 7A-7E and 8A-8E, a graph A shows a reference input (Wref) for control of a rotating shaft, a graph B shows a motor speed command applied (Whull) for stabilization when disturbance is generated, a graph C shows a speed output (Wm) of a motor (not shown), a graph D is a compensation torque (f(W, ^a)) generated by a friction compensation algorithm, and a graph E shows stabilization accuracy (W(gyro)) of the rotating shaft control system.

The friction compensation algorithm refers to an algorithm for generating a compensation signal for friction compensation by using Equations 1 or 5 in the rotating shaft control system according to the exemplary embodiment.

Figure 7A:
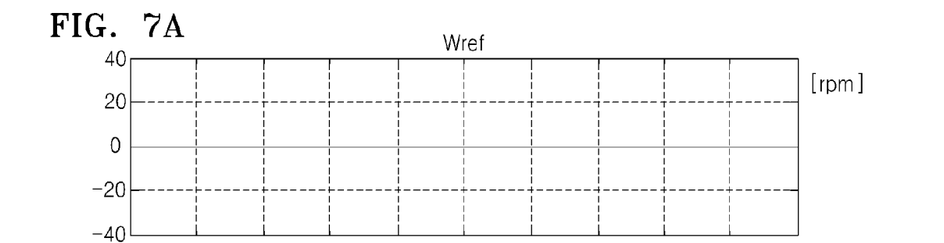
FIGS. 7A-7E are graphs showing characteristics of a rotating shaft control system when a friction compensation algorithm is not applied to the rotating shaft control system of FIG. 1A.
Figure 7B:
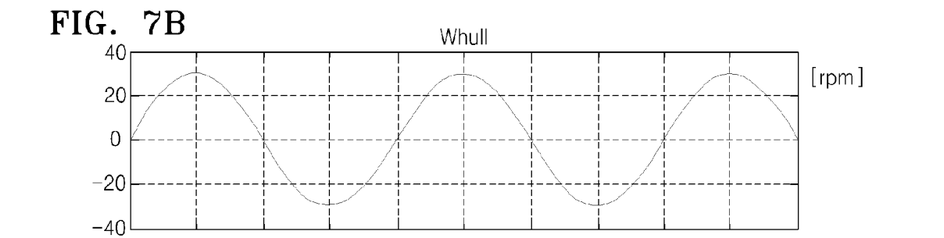
Figure 7C:
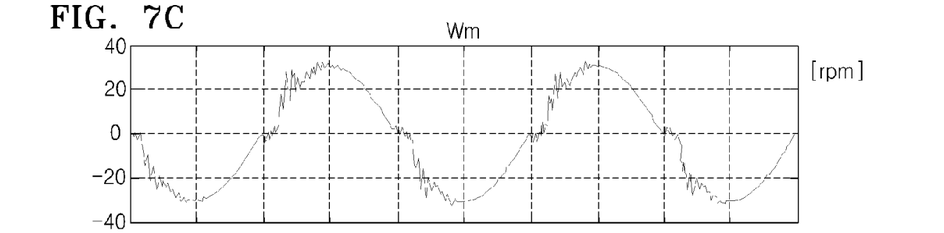
Figure 7D:
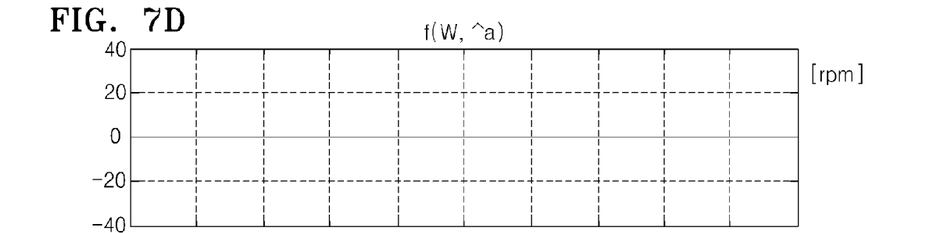
Figure 7E:
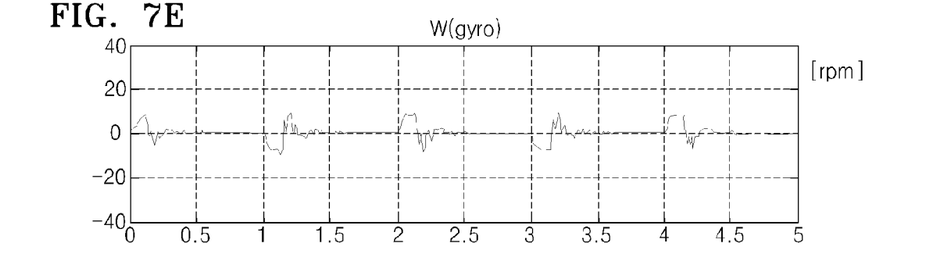
Figure 8A:
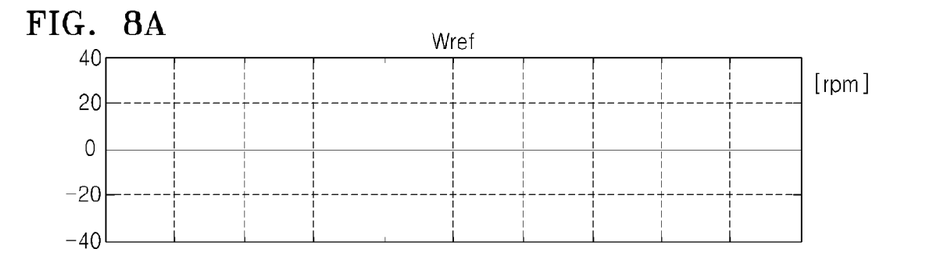
FIGS. 8A-8E are graphs showing characteristics of a rotating shaft control system when a friction compensation algorithm is applied to the rotating shaft control system of FIG. 1A.
Figure 8B:
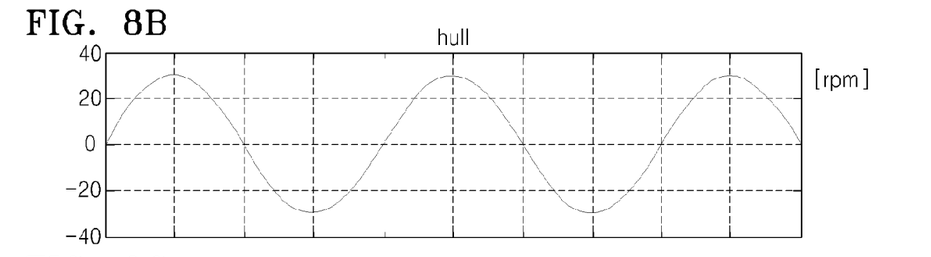
Figure 8C:
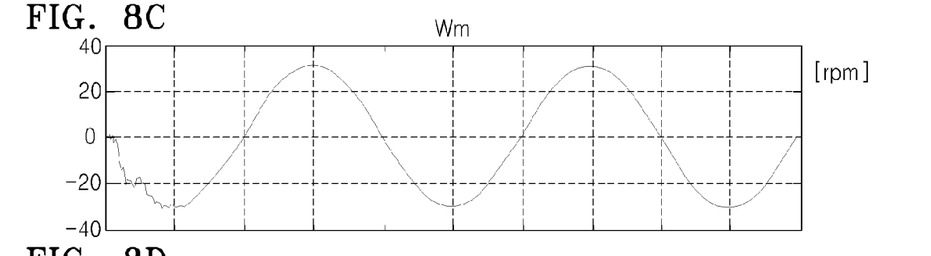
Figure 8D:
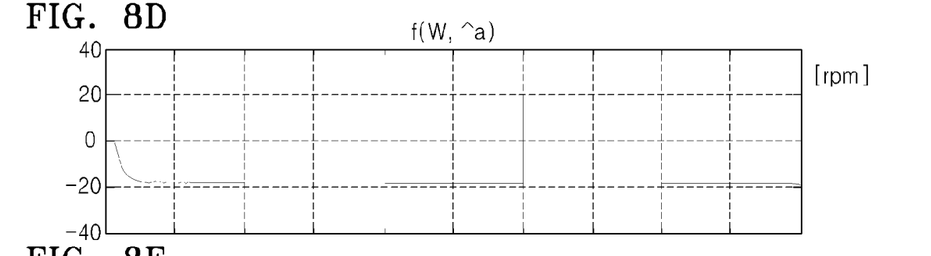
Figure 8E:
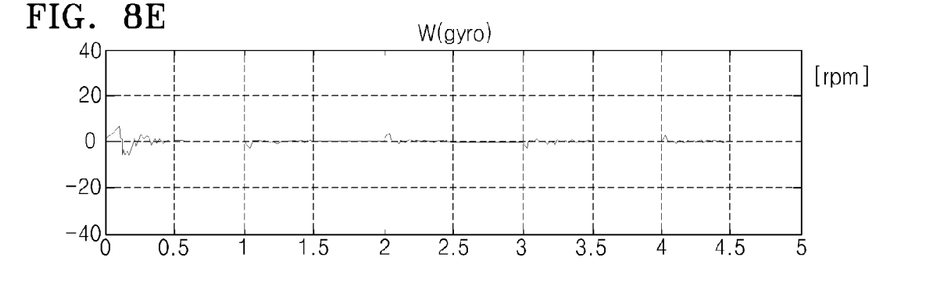

Referring to FIG. 7C, it can be seen that the output value of a speed of the motor noticeably fluctuates at a point where the speed of the motor converting from a forward direction to a reverse direction is 0. In contrast, referring to FIG. 8C, it can be seen that the output value of the speed of the motor is stably and smoothly output even at the point where the rotation of the motor is reversed is 0. FIGS. 8A-8E show that the stabilization accuracy of the rotating shaft control system is improved much by the friction compensation algorithm.

As described above, according to the rotating shaft control system according to the exemplary embodiment, since the influence of a frictional force acting between the mechanical elements is reduced by the operation of the torque compensation unit and the stabilization control unit, stabilization accuracy is improved.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation.

What is claimed is:

1. A rotating element control system, comprising:
a rotating element rotatably disposed on a main body;
a first sensor configured to measure a rotational speed of the main body;
a driver configured to drive the rotating element;
a second sensor configured to measure a rotational speed of the rotating element;
a torque compensator configured to calculate a difference between the rotational speed of the main body sensed by the first sensor and a target speed for driving the rotating element, generating a first compensation signal when the difference between the rotational speed of the main body and the target speed exists within a first range, and generating a second compensation signal when the difference between the rotational speed of the main body and the target speed exists within a second range; and
a stabilization controller configured to control the driver based on the first and second compensation signals and a difference between the target speed and the rotational speed of the rotating element sensed by the second sensor.

2. The rotating element control system of claim 1, wherein the torque compensator is configured to generate the first compensation signal if the difference between the rotational speed of the main body and the target speed is within the first range which is less than a predetermined critical value, and generates the second compensation signal if the difference between the rotational speed of the main body and the target speed is within the second range which is equal to or greater than the predetermined critical value.

3. The rotating element control system of claim 2, wherein the first compensation signal is 0 within the first range and the second compensation signal is calculated by an equation, $T_{fric}=K_t \cdot A \cdot sign(\omega_r-\omega_h)$ within the second range,
wherein "$T_{fric}$" denotes the compensation signals, "$K_t$" denotes a motor constant, "A" denotes current applied to the driver, "$\omega_h$" denotes the rotational speed of the main body, "$\omega_r$" denotes the target speed, and "$sign(\omega_r-\omega_h)$" denotes a function for outputting 1 or −1 according to a sign of $(\omega_r-\omega_h)$.

4. The rotating element control system of claim 2, wherein the first compensation signal is calculated by an equation, $$T_{fric} = \frac{K_t \cdot A}{\varepsilon} \cdot (\omega_r - \omega_h)$$

within the first range, and the second compensation signal is calculated by another equation, $T_{fric}=K_t \cdot A \cdot sign(\omega_r-\omega_h)$ within the second range,
wherein "$T_{fric}$" denotes the first compensation signal and the second compensation signal, "$K_t$" denotes a motor constant, "A" denotes current applied to the driver, "$\omega_h$" denotes the rotational speed of the main body, "$\omega_r$" denotes the target speed, and "$sign(\omega_r-\omega_h)$" denotes a function for outputting 1 or −1 according to a sign of $(\omega_r-\omega_h)$.

5. The rotating element control system of claim 1, wherein the stabilization controller comprises:
an integral controller configured to integrate the difference between the rotational speed of the rotating element and the target speed; and
a proportional derivative controller configured to receive the rotational speed of the rotating element as an input.

6. The rotating element control system of claim 5, wherein the stabilization controller is configured to generate a control signal based on the difference between a target speed and the rotational speed of the rotating element, the compensation signal, and an output from the proportional derivative controller.

7. The rotating element control system of claim 6, wherein the stabilization controller is configured to generate the control signal by adding the compensation signal and an output signal of the integral controller based on the difference between the rotational speed of the rotating element and the speed of the command to drive the rotating element; and subtracting the output signal of the proportional derivative controller.

8. A method of reducing influence of a frictional force acting between mechanical elements, the method comprising:
sensing a rotational speed of a main body by a first sensor;
sensing a rotational speed of a rotating element by a second sensor;
calculating a difference between the rotational speed of the main body and a target speed for driving the rotating element;
calculating a first compensation signal when the difference between the rotational speed of the main body and the target speed is within a first range;
calculating a second compensation signal when the difference between the rotational speed of the main body and the target speed is within a second range;
generating a control signal based on the first and second compensation signals and a difference between the target speed and the rotational speed of the rotating element; and
outputting the control signal for controlling the rotating element.

9. The method of claim 8, wherein the first range is a range in which the difference between the rotational speed of the main body and the target speed is less than a predetermined critical value, and the second range is a range in which the difference between the rotational speed of the main body and the target speed is equal to or greater than the predetermined critical value.

10. The method of claim 9, wherein the first compensation signal is 0 within the first range and the second compensation signal is calculated by the equation, $T_{fric}=K_t \cdot A \cdot sign(\omega_r-\omega_h)$ within the second range, wherein "$T_{fric}$" denotes the compensation signals, "$K_t$" denotes a motor constant, "A" denotes current applied to a driver configured to drive the rotating element, "$\omega_h$" denotes the rotational speed of the main body, "$\omega_r$" denotes the target speed and "$\text{sign}(\omega_r-\omega_h)$" denotes a function for outputting 1 or −1 according to a sign of $(\omega_r-\omega_h)$.

11. The method of claim 9, wherein the first compensation signal is calculated by an equation, $$T_{fric} = \frac{K_t \cdot A}{\varepsilon} \cdot (\omega_r - \omega_h)$$

within the first range, and the second compensation signal is calculated by an equation, $T_{fric}=K_t \cdot A \cdot \text{sign}(\omega_r-\omega_h)$ within the second range, wherein "$T_{fric}$" denotes the first compensation signal and the second compensation signal, "$K_t$" denotes a motor constant, "A" denotes current applied to a driver configured to drive the rotating element, "$\text{sign}(\omega_r-\omega_h)$" denotes a function for outputting 1 or −1 according to a sign of $(\omega_r-\omega_h)$, "$\omega_h$" denotes the rotational speed of the main body, and "$\omega_r$" denotes the target speed.

12. A rotating element control system comprising:
a mechanical system comprising a driver configured to drive a rotating element,
a controller configured to receive a rotational speed of a main body, an input signal for driving the rotating element and a rotational speed of a rotating element, to generate a first compensation signal within a first range and a second compensation signal within a second range, and to output the compensation signals,
wherein the controller comprises:
a motion compensator; and
a stabilization controller,
wherein the first range is a range in which the difference between the rotational speed of the main body and a target speed for driving the rotating element is less than a predetermined critical value, and the second range is a range in which the difference between the rotational speed of the main body and the target speed is equal to or greater than the predetermined critical value.

13. The rotating element control system of claim 12, wherein the first compensation signal is 0 within the first range and the second compensation signal is calculated by the equation, $T_{fric}=K_t \cdot A \cdot \text{sign}(\omega_r-\omega_h)$ within the second range, wherein "$T_{fric}$" denotes the compensation signals, "$K_t$" denotes a motor constant, "A" denotes current applied to the driver, "$\text{sign}(x)$" denotes a function for outputting 1 or −1 according to a sign of x, "$\omega_h$" denotes the rotational speed of the main body, and "$\omega_r$" denotes the c target speed.

14. The rotating element control system of claim 12, wherein the first compensation signal is calculated by an equation, $$T_{fric} = \frac{K_t \cdot A}{\varepsilon} \cdot (\omega_r - \omega_h)$$

within the first range, and the second compensation signal is calculated by another equation, $T_{fric}=K_t \cdot A \cdot \text{sign}(\omega_r-\omega_h)$ within the second range, wherein "$T_{fric}$" denotes the first compensation signal and the second compensation signal "$K_t$" denotes a motor constant, "A" denotes current applied to the driver, "sign (x)" denotes a function for outputting 1 or −1 according to a sign of x," "$\omega_h$" denotes the rotational speed of the main body, and "$\omega_r$" denotes the target speed.

15. The rotating element control system of claim 12, wherein the stabilization contoller comprises:
an integral controller configured to integrate the difference between the rotational speed of the rotating element and the target speed; and
a proportional derivative controller configured to receive the rotational speed of the rotating element as an input.

16. The rotating element control system of claim 15, wherein the stabilization controller is configured to generate a control signal based on the difference between the target speed and the rotational speed of the rotating element, the compensation signal, and an output from the proportional derivative controller.

17. The rotating shaft control system of claim 16, wherein the stabilization controller is configured to generate the control signal by adding the compensation signal and an output signal of the integral controller; and subtracting the output signal of the proportional derivative controller.

* * * * *